United States Patent [19]
Bradley

[11] Patent Number: 5,845,981
[45] Date of Patent: Dec. 8, 1998

[54] MULTI-COLOR-BAND SCROLLING ACROSS SINGLE-PANEL LIGHT VALVE

[75] Inventor: Ralph Hampton Bradley, Ossining, N.Y.

[73] Assignee: Philips Electronics North America Corporation, New York, N.Y.

[21] Appl. No.: 999,323

[22] Filed: Dec. 29, 1997

[51] Int. Cl.$^6$ .......................... G03B 21/00; G03B 21/26; H04N 5/64
[52] U.S. Cl. .................. 353/31; 353/34; 348/744
[58] Field of Search .................. 353/31, 33, 34, 353/37, 81; 349/5, 7, 8; 348/742, 743; 359/209, 211

[56] References Cited

U.S. PATENT DOCUMENTS

| | | | |
|---|---|---|---|
| 5,098,184 | 3/1992 | Van Den Brandt et al. | 353/102 |
| 5,410,370 | 4/1995 | Janssen | 348/756 |
| 5,416,514 | 5/1995 | Janssen et al. | 348/196 |
| 5,428,467 | 6/1995 | Schmidt | 359/40 |
| 5,479,187 | 12/1995 | Chen | 345/102 |
| 5,508,738 | 4/1996 | Janssen et al. | 348/196 |
| 5,528,318 | 6/1996 | Janssen | 348/756 |
| 5,532,763 | 7/1996 | Janssen et al. | 348/744 |
| 5,548,347 | 8/1996 | Melnik et al. | 348/761 |
| 5,560,697 | 10/1996 | Lim et al. | 353/31 |
| 5,608,467 | 3/1997 | Janssen et al. | 348/744 |
| 5,644,357 | 7/1997 | Cohen et al. | 348/196 |
| 5,658,060 | 8/1997 | Dove | 353/33 |

FOREIGN PATENT DOCUMENTS

| | | | |
|---|---|---|---|
| 0653658 | 5/1995 | European Pat. Off. | G02B 26/10 |
| 1467963 | 3/1977 | United Kingdom | G02F 1/03 |

*Primary Examiner*—Howard B. Blankenship
*Assistant Examiner*—Hung Henry Nguyen
*Attorney, Agent, or Firm*—Robert J. Kraus

[57] ABSTRACT

A scanning-light-band display apparatus includes a light-valve panel and an optical system. The optical system includes a multicolor light source and a faceted, rotatable light-transmissive polygonal prism. The light source projects illumination rays for forming images of red, green and blue light bands through the prism along different respective paths. A combination of optical components is arranged for intercepting the illumination rays and forming the images on the panel.

12 Claims, 2 Drawing Sheets

MULTI-COLOR-BAND SCROLLING ACROSS SINGLE-PANEL LIGHT VALVE

BACKGROUND OF THE INVENTION

1. Field of the Invention

This invention relates to color video projection systems and in particular to the scrolling of multiple color bands across a single-panel light valve in such a system.

2. Description of Related Art

U.S. Pat. No. 5,548,347, which is hereby incorporated by reference, discloses a number of systems in which light from an intense white light source, for example an arc lamp, is collected, and separated using dichroic filters into light bands of the primary colors, i.e. red, green and blue. The color-separated light bands are arrayed adjacently, with each band being narrower in one direction, e.g. the "vertical" direction, and wider in another direction, e.g. the "horizontal" direction. Scanning optics are employed to cause the three bands of light to be imaged onto a light-valve panel. This arrangement proves very effective when utilizing a matrix display panel such as, for example, a liquid crystal display (LCD) panel. Regardless of what type of light-valve panel is utilized, the scanning optics cause the bands of illumination to move across the panel. As each band passes over the "top" of the active area of the panel, a band of light of that color typically leaves the "bottom" of the panel. Accordingly, there is a continual sweep of the three colors across the panel.

Prior to each color band passing over a given row of pixels on the panel, that row will have been addressed with the appropriate brightness information for that color. Each row of the panel is addressed three times for each video field which is to be displayed.

The simultaneous use of a substantial portion of the available red, green and blue light through a single light valve panel provides optical efficiencies comparable to that of three-panel systems employing the same types of light-valve panels. Using only a single panel eliminates the need to mechanically converge different color images, formed on different panels, and further reduces system cost. Additionally, beam-combining dichroic filters are not needed which leads to further cost savings.

The various scanning systems disclosed in U.S. Pat. No. 5,548,347 have many advantages, particularly optical efficiency. The single-prism scanning system disclosed in the patent is also simple and compact. The multiple-prism (either separated or physically joined) scanning systems offer better scan-speed uniformity (for the different color light bands) and scan-speed linearity (for each light band) than the single-prism system but are less compact.

SUMMARY OF THE INVENTION

It is an object of the invention to provide a single-panel display arrangement having the simplicity and compactness of the single-prism scanning system, but the better scan-speed uniformity and scan-speed linearity obtainable with the multiple-prism scanning system.

In accordance with the invention, a display apparatus includes a light-valve panel and an optical system for sequentially scanning light bands of different colors across the panel. The optical system includes a light-transmissive, polygonal prism, light source means, and a combination of optical components. The prism has a central axis of rotation and N facets symmetrically disposed around the axis, where N is an even number equal to at least 4. The light source means is arranged adjacent the prism for projecting through the prism illumination rays for images of first, second and third light bands of different respective colors. Central illumination rays for each of the images are propagated along a respective path which is directed at the axis of rotation. The first and second paths are also directed to converge toward the third path at an angle $\alpha=(n+\frac{1}{3}m\beta)$, where n is equal to any non-negative integer (i.e. 0, 1, . . . ), m is equal to 1 or 2, and $\beta=360°/N$. The combination of optical components is arranged to intercept the illumination rays after their passage through the prism and to guide and converge the illumination rays to form on the panel spaced-apart light bands having mutually parallel central illumination rays which scan across the panel as the prism is rotated.

DESCRIPTION OF THE PREFERRED EMBODIMENTS

Figure 1:
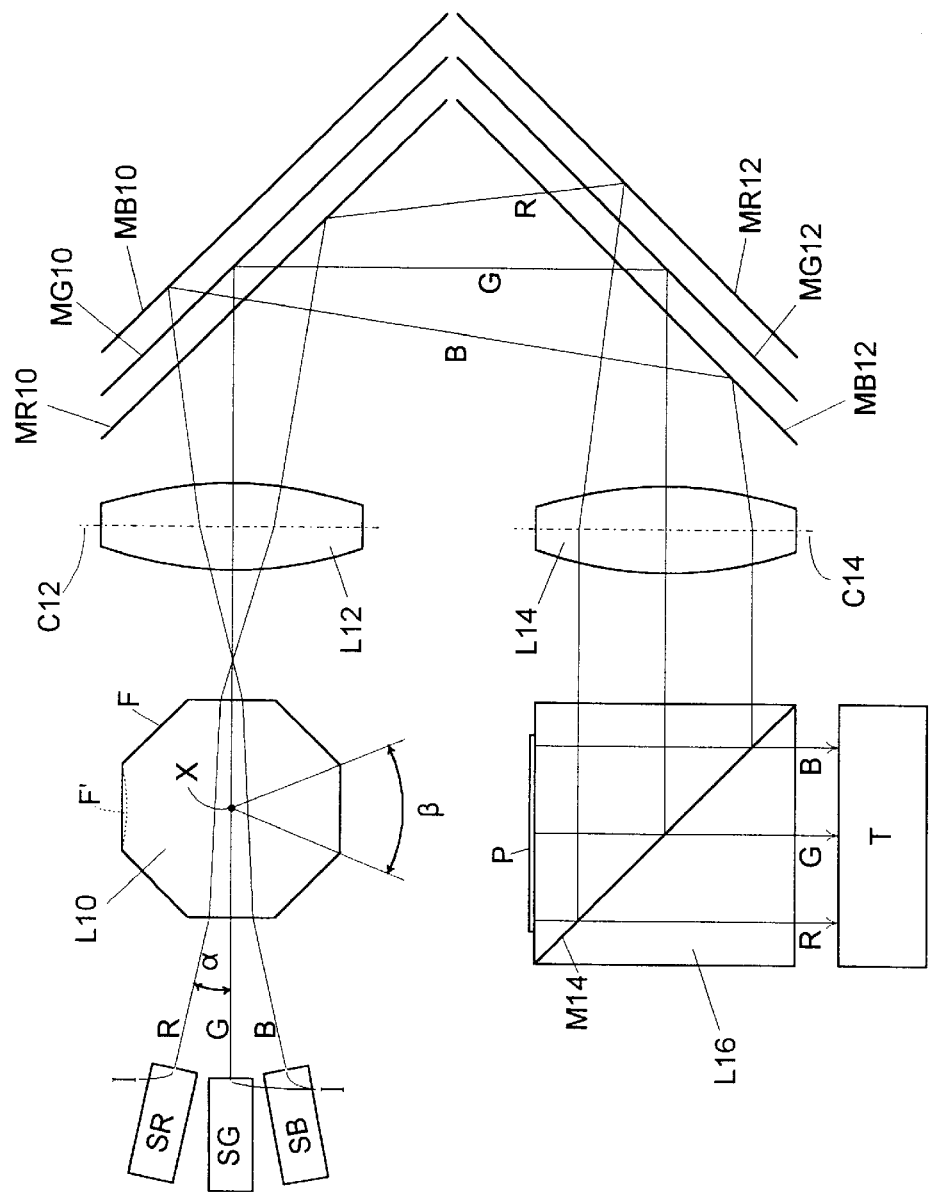
FIG. 1 is a diagram of a first embodiment of a single-panel display arrangement in accordance with the invention.

FIG. 1 is a side view of a single-panel display arrangement for guiding red, green and blue illumination rays along respective paths R, G and B to a light-valve panel P. Each of these paths represents a central axis of the respective-color illumination rays along which the central illumination rays travel. The arrangement includes individual light sources SR, SG and SB for producing the respective red, green and blue illumination rays, a symmetrically-faceted polygonal prism L10, lens groups L12 and L14, an array of mirrors MR10, MG10, MB10, MR12, MG12, MB12, and a polarizing beam splitter L16 including a mirror M14. Note that, as used in this application, the word "lens" is to be construed generally and includes any transmissive optical element having an entrance or exit surface, regardless of whether such surface or surfaces have plano or curved shapes.

Each of the light sources SR, SG, SB emits color illumination rays through a respective aperture I at which an image of the respective color light band is formed. The light sources are positioned such that the respective band images are equidistantly spaced from a central longitudinal axis X of the prism L10, which extends in the thickness direction of the prism. The light sources are also oriented to direct the central illumination rays that they produce along respective paths toward the axis X of the prism. The central red and blue illumination rays are directed toward the prism along respective outer paths (R and B) which converge toward each other and toward the path G of the central (green) illumination rays. Each of the outer paths is directed at an angle $\alpha$ (measured from the axis X) relative to the central path. The angle $\alpha$ is related to the number N of facets F in the prism. For the octagonal prism L10, shown in FIG. 1, each facet extends over an angle $\beta=360°/8=45°$. The angle $\alpha$ is selected to be $\frac{1}{3}\beta$ (or $\frac{2}{3}\beta$) so that, for each $\beta°$ rotation of the prism about the axis X, a facet becomes orthogonal to each of the three light paths one time, at which time the respective path passes directly through the axis X. At the instant portrayed in FIG. 1, a facet is orthogonal to the green path G. Note that, whenever one of the paths (e.g. green path G) passes through the axis X, it is ultimately directed at the center of the panel P.

As an alternative to the individual light sources SR, SG and SB, it is possible to use a single light source that is capable of producing images of all three light bands. A particularly advantageous light source of this type is disclosed in a U.S. patent application filed on Dec. 29, 1997 Ser. No. 08/999,319, which is hereby incorporated by reference.

As another alternative, it is possible to use concave facets F' in place of the flat facets shown. Such concave facets slightly complicate the manufacture of the prism L10, but make it possible to further improve the scan speed linearity of the bands across the panel P. Further, although a prism with eight facets symmetrically disposed around the axis X is shown, any even number of facets that is equal to or greater than four may be utilized.

The optical elements (i.e. the prism, the lenses and the mirrors) serve to continuously focus on, and scan across, the panel P each of the light bands incident to the facets of the rotating prism L10. These optical elements are selected and arranged so that, as the prism rotates, the illumination rays for each of the red, green and blue light bands follows an equivalent path, from its image at a respective aperture I, to the incidence of the respective light band with the light-valve panel P. This is important because it causes the central illumination rays for all three color bands to continuously strike the panel at the same angle of incidence (preferably orthogonal) as they are scanned across it.

Following the light paths, as they leave the prism L10 they converge and cross before entering lens group L12. Since leaving the respective apertures I, the central illumination rays for each of the light bands have been diverging. Lens group L12, in cooperation with lens group L14, reconverges the illumination rays to form red, green and blue images of the bands on the panel P.

Mirrors MR10 and MB12 are dichroic mirrors for reflecting red and blue light, respectively, and passing all other colors. These mirrors are angled relative to each other and are the closest mirrors to lens groups L12 and L14. Mirrors MG10 and MG12 are dichroic mirrors for reflecting green light and passing all other colors. These mirrors are parallel to mirrors MR10 and MB12, respectively, but are further from the lenses. Mirrors MB10 and MR12, which need not be dichroic, are also parallel to mirrors MR10 and MB12, respectively, but are further from the lenses than mirrors MG10 and MG12.

The angles between one set of the mirrors (i.e. MR10, MG10, MB10) and the other (MB12, MG12, MR12) and the spacings between the respective mirrors in each set are selected to adjust the paths of the illumination rays for the three bands so that they enter lens group L14 in approximately the same state of convergence. In the illustrated example of FIG. 1, each of the mirror sets is oriented at a 45° angle relative to a central plane (C12 or C14) of the lens group which it faces.

Lens group L14, in cooperation with lens group L12, both deflects and converges the illumination rays for the bands. The central illumination rays are deflected so that they are substantially parallel to each other when they leave lens group 14. After the illumination rays pass through lens group L14, they are reflected by mirror M14 to the panel. In this exemplary embodiment, the panel is a reflective Liquid Crystal Display and the mirror M14 is the active surface of the polarizing beam splitter L16 that is angled to reflect the illumination rays to the panel. With this arrangement, the illumination rays produced by the sources SR,SG,SB must be polarized, and the polarization must be oriented such that the central illumination rays from lens group L14 are orthogonal to the orientation that is passed by mirror M14. This mirror will then reflect the illumination rays to pixels of the LCD panel. Each pixel that is in a transmissive state will then rotate the polarization of the incident light rays by 90° and reflect the polarization-rotated rays through the mirror M14 to a target T, such as a projection lens system.

Figure 2:
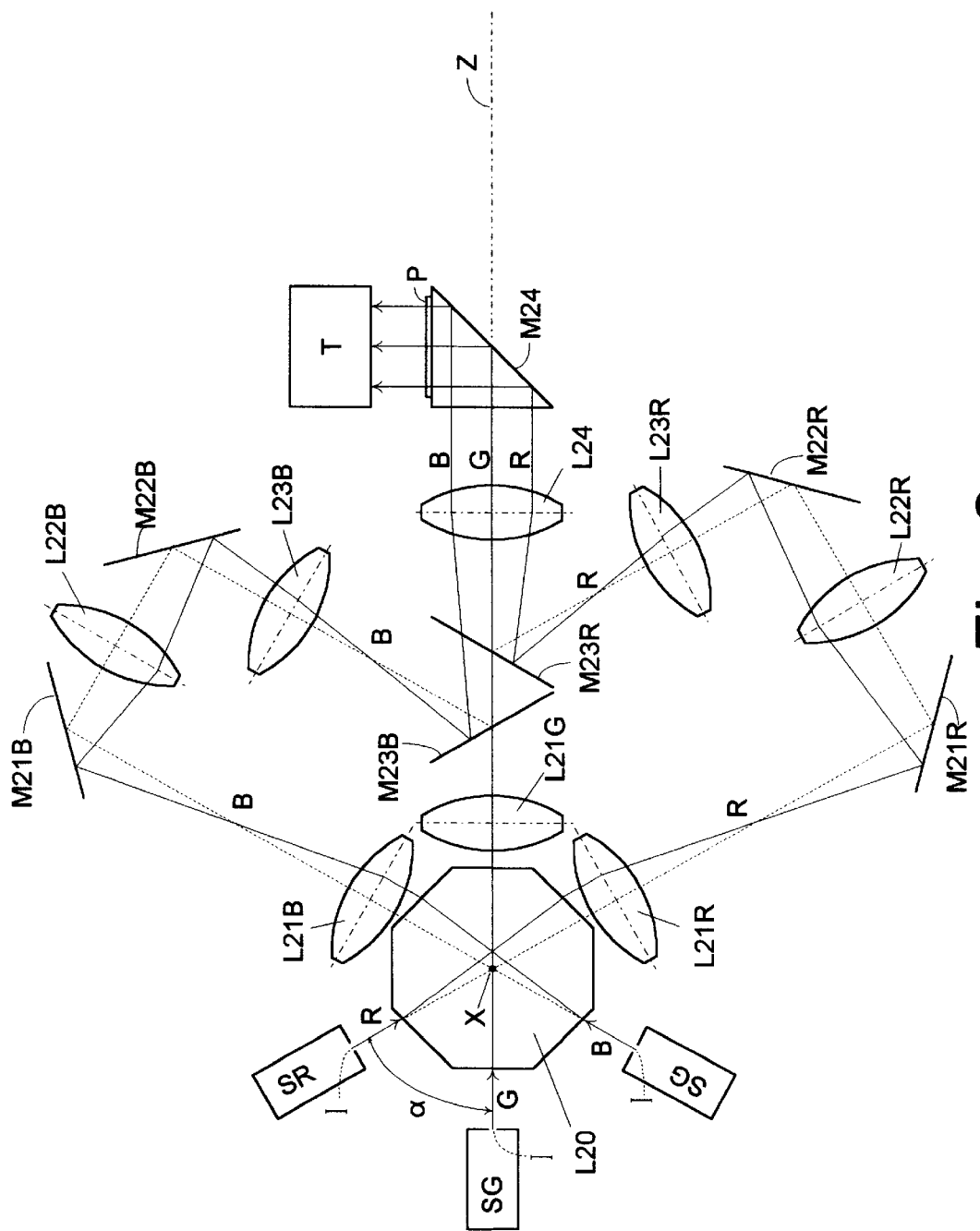
FIG. 2 is a diagram of a second embodiment of a single-panel display arrangement in accordance with the invention.

FIG. 2 is a side view of another embodiment of a single-panel display arrangement in accordance with the invention. This arrangement includes light sources SR, SG and SB and a polygonal prism L20, all of which are identical to corresponding elements in the embodiment of FIG. 1. It also includes lenses and mirrors for guiding the respective illumination rays produced by the light sources along three different paths to a light-valve panel P. The solid lines indicate the paths R, G, and B followed by the central red, green and blue illumination rays at that instant in time when the prism is in the position shown. Dashed-line paths, adjacent the solid-line paths R and B, indicate the paths of the central red and blue illumination rays when the prism L20 rotates to a position where one of its faces is perpendicular to the central ray path from the respective-color source.

As in the first embodiment, each of the light sources SR, SG, SB emits light through a respective aperture I, at or near which an image of the respective color light band is formed. These light sources are also positioned and oriented such that their respective color-band images are equidistantly spaced from the axis X of the prism L20 and the central rays they produce are directed at the axis X. However, the angle α is greater than in the embodiment of FIG. 1, to facilitate positioning of the separate lens-and-mirror arrangements provided for the red and blue illumination rays. Specifically, the angle α is selected to be 1⅓β so that, for each β° rotation of the prism about the axis X, each facet is once orthogonal to each of the three light paths, and the respective path passes directly through the axis X.

When the prism L20 is instantaneously in the position shown in FIG. 2, one of the prism faces is perpendicular to the central illumination rays from the green light-band source SB and follows a straight-line path along a Z axis. Following this path, the green light passes through a lens group L21G, a dichroic blue-light reflecting mirror M23B, a dichroic red-light-reflecting mirror M23R and a lens group L24. It is then reflected by a mirror M24 to the panel P. The prism L20, lens groups L21G and L24, and the mirror M24 form a first combination of optical elements which cooperate to focus, onto the panel P, the image of the green light band formed at or near the aperture I of the source SG.

A second combination of optical elements (also including, however, the prism L20, lens group L24 and mirror M24) cooperates to focus the blue light band onto the panel P. Following the solid-line path B, the blue illumination rays pass through the prism L20 and a lens group L21B, and are reflected by a mirror M21B through a lens group L22B to a mirror M22B. Mirror M22B reflects the blue illumination rays through a lens group L23B to a mirror M23B. Mirror M23B is a dichroic mirror which reflects blue light, but is transparent to the green light propagating along path G. After reflection by mirror M23B, the blue illumination rays pass through mirror M23R and lens group L24, and are finally reflected by mirror M24 to the panel P.

To compensate for the greater length of the blue light path B, relative to the green light path G, the second combination of optical elements includes first and second sub-combinations. Each of these sub-combinations is disposed along a respective sub-path. The first sub-combination of optical elements includes the prism L20, lens group L21B, mirror M21B and lens group L22B, for forming near mirror M22B an image of the blue light band formed in the vicinity of the aperture I of light source SB. The second sub-combination of optical elements includes lens group L23B, mirror M23B, lens group L24, and mirror M24, for forming on panel P an image of the band formed near mirror M22B.

A third combination of optical elements (also including the prism L20, lens group L24 and mirror M24) cooperates to focus the red light band onto the panel P. Following the solid-line path R, the central red illumination rays pass through the prism L20 and a lens group L21R, and are reflected by a mirror M21R through a lens group L22R to a mirror M22R. Mirror M22R reflects the red illumination rays through a lens group L23R to a mirror M23R. Mirror M23R is a dichroic mirror which reflects red light, but is transparent to the green and blue light propagating along paths G and B, respectively. After reflection by mirror M23R, the red illumination rays pass through lens group L24, and are finally reflected by mirror M24 to the panel P.

To compensate for the greater length of the red light path R, relative to the green light path G, the third combination of optical elements also includes respective first and second sub-combinations. Each of these sub-combinations is disposed along a respective sub-path. The first sub-combination of optical elements, for the red path, includes the prism L20, lens group L21R, mirror M21R and lens group L22R, for forming near mirror M22R an image of the red light band formed in the aperture of light source SR. The second sub-combination of optical elements includes lens group L23R, mirror M23R, lens group L24, and mirror M24, for forming on panel P an image of the band formed near mirror M22R.

The second and third combinations of optical elements are arranged to ensure that the central illumination rays forming the red and blue bands on the panel P are substantially parallel to the central illumination rays forming the green band on the panel. In the embodiment of FIG. 2, each of the blue and red sub-paths has a length which is approximately equivalent to the green path length (measured from the aperture I of light source SG to the panel P).

What is claimed is:

1. A display apparatus including a light-valve panel and an optical system for sequentially scanning light bands of different colors across the panel, said optical system comprising:

a. a light-transmissive, polygonal prism, having a central axis of rotation and N facets symmetrically disposed around the axis, where N is an even number equal to at least 4;

b. light source means for projecting through the prism illumination rays for forming images of first, second and third light bands of different respective colors, central illumination rays for the first, second and third light bands being propagated along respective first, second and third paths which are directed at the axis of rotation, the first and second light ray paths being directed to converge toward the third light ray path at an angle $\alpha=(n+\frac{1}{3}m\beta)$, where n is equal to any non-negative integer, m is equal to 1 or 2, and $\beta=360°/N$;

c. a combination of optical components arranged to intercept the illumination rays after passage through the prism and to guide and converge said illumination rays to form on the panel the first, second and third light bands, said light bands having substantially parallel central illumination rays and scanning across the panel as said prism is rotated around said axis.

2. A display apparatus as in claim 1 where each of said facets extends over said angle $\beta$.

3. A display apparatus as in claim 1 where each of said facets is flat.

4. A display apparatus as in claim 1 where each of said facets is concave.

5. A display apparatus including a light-valve panel and an optical system for sequentially scanning light bands of different colors across the panel, said optical system comprising:

a. a light-transmissive, polygonal prism, having a central axis of rotation and N facets symmetrically disposed around the axis, where N is an even number equal to at least 4;

b. light source means for projecting through the prism illumination rays for forming images of first, second and third light bands of different respective colors, central illumination rays for the first, second and third light bands being propagated along respective first, second and third paths which are directed at the axis of rotation, the first and second light ray paths being directed to converge toward the third light ray path at an angle $\alpha=(n+\frac{1}{3}m\beta)$, where n is equal to any non-negative integer, m is equal to 1 or 2, and $\beta=360°/N$;

c. first and second lens means for collectively converging the illumination rays projected through the prism;

d. an arrangement of mirrors for directing the illumination rays from the first lens means to the second lens means along different paths for the respective bands such that the central illumination rays for each of the bands enter the second lens means in approximately the same state of convergence and exit said second lens means substantially in parallel;

the panel being disposed relative to the second lens means such that the illumination rays exiting the second lens means form on said panel separate scanning images of the first, second and third light bands as said prism is rotated around said axis.

6. A display apparatus as in claim 5 where each of said facets extends over said angle $\beta$.

7. A display apparatus as in claim 5 where each of said facets is flat.

8. A display apparatus as in claim 5 where each of said facets is concave.

9. A display apparatus including a light-valve panel and an optical system for sequentially scanning light bands of different colors across the panel, said optical system comprising:

a. a light-transmissive, polygonal prism, having a central axis of rotation and N facets symmetrically disposed around the axis, where N is an even number equal to at least 4;

b. light source means for projecting through the prism illumination rays for forming images of first, second and third light bands of different respective colors, central illumination rays for the first, second and third light bands being propagated along respective first, second and third paths which are directed at the axis of rotation, the first and second light ray paths being directed to converge toward the third light ray path at an angle $\alpha=(n+\frac{1}{3}m\beta)$, where n is equal to any non-negative integer, m is equal to 1 or 2, and $\beta=360°/N$;

c. a first combination of optical components arranged to intercept the illumination rays for the first light band after passage through the prism and to guide and converge said illumination rays to form on the panel said image of the first light band;

d. a second combination of optical components arranged to intercept the illumination rays for the second light band after passage through the prism and to guide and converge said illumination rays to form on the panel said image of the second light band;

e. a third combination of optical components arranged to intercept the illumination rays for the third light band after passage through the prism and to guide and converge said illumination rays to form on the panel said image of the third light band;

the central illumination rays for said first, second and third light bands being substantially parallel at incidence with the panel and said light bands scanning across said panel as said prism is rotated around said axis.

10. A display apparatus as in claim 9 where each of said facets extends over said angle $\beta$.

11. A display apparatus as in claim 9 where each of said facets is flat.

12. A display apparatus as in claim 9 where each of said facets is concave.

* * * * *

UNITED STATES PATENT AND TRADEMARK OFFICE
CERTIFICATE OF CORRECTION

PATENT NO. : 5,845,981

DATED : December 8, 1998

INVENTOR(S) : RALPH HAMPTON BRADLEY

It is certified that error appears in the above-identified patent and that said Letters Patent is hereby corrected as shown below:

Column 1, before the first paragraph insert:

--This invention was made with United States Government support under Award 70NANB5H1070, entitled "High Information Content Display Technology", awarded by the Department of Commerce through its National Institute of Science & Technology (NIST).--

Signed and Sealed this

Thirty-first Day of August, 1999

Attest:

Q. TODD DICKINSON

*Attesting Officer*       Acting Commissioner of Patents and Trademarks